INVENTOR.
BOONE B. OWENS

United States Patent Office 3,476,605
Patented Nov. 4, 1969

3,476,605
SOLID STATE ELECTRIC CELL UTILIZING AS AN ELECTRON ACCEPTOR MATERIAL AN ORGANIC AMMONIUM POLYIODIDE
Boone B. Owens, Calabasas, Calif., assignor to North American Rockwell Corporation
Filed July 6, 1967, Ser. No. 651,498
Int. Cl. H01m *11/00*
U.S. Cl. 136—83      12 Claims

ABSTRACT OF THE DISCLOSURE

An organic ammonium polyiodide cathode component for a solid state electric cell containing a silver anode and an ionically conductive silver-containing solid electrolyte. The polyiodide compositions utilizable as electron-acceptor cathode component are defined as $QI_n$ where Q is an organic ammonium cation, preferably a quaternary ammonium cation, and $n$ has a value ranging from 2 to 11, inclusive. Specifically preferred polyiodide compositions are tetramethylammonium heptaiodide $N(CH_3)_4I_7$ and the tetraethylammonium triiodide $N(C_2H_5)_4I_3$ and heptaiodide $N(C_2H_5)_4I_7$.

CROSS REFERENCES TO RELATED APPLICATIONS

The improved cathodes of the present invention may be utilized with the inorganic solid ionic conductors and electric cells containing these conductors as solid electrolyte element which are disclosed in copending applications Ser. No. 569,193, 573,743, and 573,744 all filed Aug. 1, 1966, and assigned to the assignee of the present application. The cathodes of this invention are of particular utility in the electric cells having conductive organic ammonium silver iodide salts as solid electrolyte element, which are disclosed in commonly assigned copending application Ser. No. 651,499 filed of even date herewith.

BACKGROUND OF THE INVENTION

This invention relates to solid state electric cells having improved cathode compositions. It more particularly relates to such solid state electric cells having an ionically conductive silver composition as solid eletcrolyte element.

Solid state electric cells utilizing a solid ionic conductor as electrolyte are known and are generally advantageous compared with conventional cells and batteries with respect to shelf-life stability, leak-free properties, freedom from pressure buildup during the electrochemical reaction, and flexibility with respect to construction design and miniaturization. One cell employing silver iodide as the solid electrolyte is described in U.S. Patent 2,689,876, "Soild Ion Electrolyte Battery." Improved solid state cells having a solid electrolyte of higher ionic conductivity than that of silver iodide are disclosed in the referred-to copending applications Ser. Nos. 569,193, 573,743, and 651,499. These cells generally utilize silver as the electron-donor anode material and a nonmetal capable of functioning as an electron acceptor for the cathode material. Several such cathode materials are shown in U.S. Patent Re. 24,408. Iodine dispersed in a carbon matrix is generally preferred as cathode material, although other iodine sources such as a mixture of $Ag_2S$ and $I_2$, $RbI_3$, $CsI_3$, and $NH_4I_3$ have also been suggested. Since iodine may be lost by diffusion or evaporation, the cell is generally encapsulated with a protective resin or other material.

However, the use of pure iodine as a cathode material has been found disadvantageous because of the occurrence of cell corrosion, loss in cell stability, and poor shelf life due to excessively high iodine activity, resulting in reaction of iodine with the solid state electrolyte or the other cell components. Attempts have been made to use the inorganic alkali metal polyiodides, e.g., $RbI_3$, $CsI_3$, as cathode components. While this results in a lowering of the iodine activity, there is a substantial increase in material costs and a lower availability of iodine based on unit weight of the cathode component.

SUMMARY OF THE INVENTION

It is an object of the present invention to provide an improved iodine-source cathode material for a solid state electric cell. It is a further object to provide a cathode material that is particularly compatible for use with organic ammonium silver iodide electrolytes.

In accordance with the present invention there is provided a solid state electric cell having an improved cathode. The cell comprises a conductive anode, preferably of silver, an ionically conductive solid state silver-ion electrolyte, and a cathode composition including an organic ammonium polyiodide component as the electron-acceptor cathode material. The organic ammonium iodide salts may be expressed by the empirical formula $QI_n$, Q being a univalent organic ammonium cation, preferably a quaternary ammonium cation. $I_n$ is an anionic polyiodide complex having a net charge of minus one, $n$ having a value between 2 and 11, inclusive, preferably between 3 and 7. The nitrogen of the organic ammonium cation complex may be attached to separate organic groups or may form part of a cyclic structure.

Because of chemical reaction between the organic ammonium polyiodide cathode component and the silver-ion electrolyte at the cathode-electrolyte interface, an organic ammonium silver iodide salt will be formed. It is preferred that this formed salt be of relatively high ionic conductivity, i.e., greater than that of silver iodide, to avoid degradation of the cell current. A high-conductivity reaction product is obtained where Q is an organic ammonium cation having an ionic volume between 30 and 85 cubic angstroms, as more fully described in copending application Ser. No. 651,499, filed of even date herewith and incorporated herein by reference.

DESCRIPTION OF THE PREFERRED EMBODIMENTS

Figure 1:
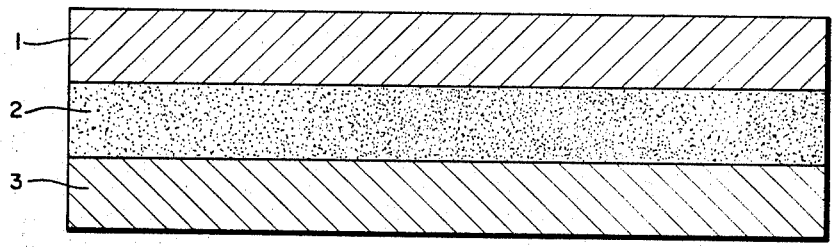
FIG. 1 is a cross sectional view of an idealized embodiment of a solid state electric cell provided by this invention.

The electron-acceptor cathode component of the present invention may be utilized in any solid state electric cell having a conductive-anode electron donor, preferably silver, and a solid electrolyte wherein the current preferably is transported by silver cations. The cathode compositions $QI_n$ provide a lower iodine activity compared with that of pure iodine and generally also the inorganic polyiodides, resulting in greater cell stability, longer shelf-life, and less corrosion. The iodine activity may be expressed as the ratio of the equilibrium vapor pressure of iodine in the polyiodide compound to that of pure $I_2$. A suitable range of activity will be from $10^{-5}$ to 1. For electric cells operating over a wide temperature range, from $-50$ C. to $150°$ C., a preferred range of iodine activity of the polyiodide is from $10^{-2}$ to $10^{-3}$. For low temperature operation, higher iodine activity is preferred, from $10^{-1}$ to $10^{-2}$; at room temperature from $10^{-2}$ to $10^{-4}$; at elevated temperatures, activities as low as $10^{-5}$ are suitable. Since the iodine activity is related to the electromotive force of the cell as described by the well-known Nernst equation, the activity of the iodine may be expressed in terms of cell voltage itself Generally, the desired $QI_n$ component is incorporated in the cathode composition in a standard test cell, and the open-cell voltage is measured. For a pure iodine cathode, an open cell voltage of about 0.67 volt is obtained. A suitable range of cell voltages for the practice of the present invention lies between 0.60 to 0.665. Cell voltages below 0.60 are unduly limiting with respect to the current that may flow. Cell voltages above 0.665, which is that obtained using $RbI_3$ as cathode composition, are indicative of excess iodine activity and characterize cells having poor stability. Thus, the selection of a specific electron-acceptor cathode component $QI_n$ represents a balance between desired current flow and increased iodine activity, and will be determined by the particular cell characteristics desired and planned use of the cell.

The value of $n$ in $QI_n$ will vary from 2 to 11, with compositions between $QI_3$ and $QI_7$ being generally preferred. Particularly preferred compositions are $N(C_2H_5)_4I_3$ and $N(C_2H_5)_4I_7$. For increasing values of $n$, particularly above 9, the equilibrium vapor pressure of the iodine in the compound correspondingly increases and may become excessive, approaching that of pure iodine, because all the iodine cannot be bound by the Q cation complex. In general, as the formula weight of Q is increased, the value of $n$ will be increased in order not to unduly lower the amount of available iodine on a weight percentage basis. The formula weight of Q and the value of $n$ may be correlatively selected to provide a preselected value of iodine activity. Also,

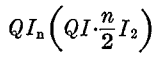

may represent a single material or a mixture of several materials having different $n$ values to provide an averaged composition of empirical formula $QI_n$.

Q may be any cationic organic ammonium complex. However, some reaction does occur between Ag ion and $QI_n$ at the electrolyte-cathode interface to form an organic ammonium silver iodide composition. Thus it is generally preferred that these formed compositions at the interface be conductive so as not to unduly degrade or limit the current-carrying capacity of the cell. Therefore, the limitations imposed with respect to Q as set forth in copending application Ser. No. 651,499 are also used herein for the preferred organic ammonium iodide compounds. The following is a more detailed description of a preferred characterization of Q. Thus, in its preferred aspects Q is defined as an organic ammonium cation having a cationic volume between 30 and 85 A.³ (cubic angstroms). Where the substituents on the nitrogen atom of Q are aliphatic groups, e.g., methyl, ethyl; or aralkyl groups, e.g., benzyl; then Q preferably is a quaternary ammonium ion; i.e., four carbon atoms are attached to the nitrogen atom. The nitrogen atom of the organic ammonium cation complex may be attached to separate organic groups or may be part of the heterocyclic compound.

For an acrylic organic ammonium ion, i.e., one where the nitrogen is not part of the ring structure, and the substituents are aliphatic or aralkyl groups, it has been found that four carbon atoms must be linked to the nitrogen atom; that is, the ammonium compound is a quaternary ammonium compound in its strictest sense, no hydrogen being attached to the nitrogen atom. Where the four R groups are aliphatic substituents, it has been found that the total number of carbon atoms present may vary from four to nine. Illustrative of suitable aliphatic substituent groups for attachment to the nitrogen atom of the quaternary ammonium cation complex are $Me_4$, $Me_3Et$, $Me_3Pr$, $Me_3i$-$Pr$, $Me_2Et_2$, $MeEt_3$, $MeEt_2Pr$, $MeEt_2i$-$Pr$, $Et_4$, $MeEt_2Bu$, $Et_3Pr$, $Me_3Ay$, where Me=methyl, Et=ethyl, Pr=propyl, i-Pr=isopropyl, Bu=butyl, and Ay=allyl.

The molecular volumes for these quaternary ammonium cations range from 42 to 80 A.³. Because of the ready availability of the starting materials, the satisfactory polyiodide iodine activity, and the high conductivity of the resultant quaternary ammonium silver iodides that may be formed, the lower alkyl groups, particularly methyl and ethyl, are preferred as substituent groups.

Substituents other than aliphatic groups may also be attached to the noncyclic nitrogen atom provided the volume of the resulting cation $Q^+$ is between 30 and 85 A.³. Thus, carbocyclic, aryl and benzyl substituents may be attached in addition to aliphatic ones. Illustrative of such suitable substituent groups are trimethylcyclohexyl, trimethylphenyl and trimethylbenzyl.

The nitrogen atom may also form part of a cyclic structure. Illustrative of suitable cations are azacyclic: N,N-dimethylpyrrolidinium; azabicyclic: 8,8-dimethyl-8-azoniabicyclo[3.2.1]octane; azoniaspiro: 5-azoniaspiro-[4.4]nonane; and heterocyclic: pyridinium, N-methylpyridinum, α-picolinium, N-methylquinolinium, N-methylacridinium, 1,1,2-trimethylpyrrolium, and N,N-dimethylindolium.

The size of the cation $Q^+$ is one of the important parameters determining the conductivity of the organic ammonium silver iodide salts. For a high ionic conductivity (defined as greater than that of silver iodide), the size of the organic cation is between 30 and 85 A.³.

The values for the volume of the cationic complex are determined by using the molecular volumes for the corresponding hydrocarbon analogs according to the equation $$V_m = \frac{1}{7.228} \frac{MW}{d_c}$$

where $V_m$ represents the molecular volume in cubic angstroms, MW is the molecular weight, and $d_c$ is the critical density in grams per cubic centimeter. Critical density values for hydrocarbons are readily available in the literature or conveniently estimated. Since molecular volume $V_m$ is proportional to the Van der Waals' constant $b$, and $b$ is universally proportional to the critical density $d_c$, the molecular volume can be readily calculated.

The calculated volumes for the hydrocarbon analogs correspond approximately to those of the organic ammonium cations since the C—C bond and the C—N bond are almost the same length and the $Q^+$ cation is isoelectronic with its hydrocarbon analog. Thus a good approximation to the size (volume) of $Q^+$ is the volume of the isoelectronic hydrocarbon.

Determination of the molecular volume of the hydrocarbon analog permits a ready selection of suitable organic ammonium cations. For example, using the upper limit of 85 A.³ and where all four substituents are not aliphatic groups, it is readily determined that about five carbons can be added to a cation containing a phenyl group, about five carbons to a pyridyl system, about three in a quinolyl system, and four to five if there is a cyclohexyl group as substituent. Thus, $Et_3C_6H_5N^+$ would be one of the largest allowable cations containing a phenyl group. If the phenyl group itself is substituted with alkyl groups or separated from the nitrogen by methylene groups, then the carbon content of the other substituents attached to the nitrogen atom would have to be proportionately reduced to maintain the desired upper limit of cationic volume.

The polyiodide compositions may be prepared by combining the organic ammonium iodide with a desired molar portion of iodine and heating the mixture in a closed vessel at a temperature between 60 and 125° C. and then quenching the product. Or the cathode composition may be prepared by first blending the quaternary ammonium iodide with carbon and a conductive electrolyte and then heating the mixture with iodine. In U.S. Patent 3,028,427 are shown methods for the preparation of various quaternary ammonium iodide compounds used as germicidal compositions.

In FIG. 1 is shown a cross sectional view of an idealized embodiment of a solid state electric cell provided by this invention. The several layers are shown in a nonscalar simplified form, an anode 1 consisting of any suitable metallic conductor which functions as an electron donor. Preferably, silver is used as the anode material, as a thin sheet or foil, although copper and other conductive materials may also be utilized. The electrolyte 2 comprises any silver-ion solid state material such as the silver halides or $Ag_3SI$, and preferably the ionic conductive compositions shown in copending application Ser. No. 569,193 and Ser. No. 651,499. The cathode 3 heretofore has consisted of a nonmetallic electron acceptor as shown, for example, in U.S. Patents 2,690,465, 2,696,513 and Re. 24,408, generally elemental iodine prepared as an intimate mixture of carbon and iodine. Electrical leads (not shown) are conventionally attached to the anode 1 and cathode 3.

The advantages provided by the present invention are obtained by using an organic ammonium polyiodide material as the electron acceptor component of the cathode 3, thereby lowering the iodine activity and providing increased cell stability and shelf-life without undue degradation of the current-carrying capacity of the cell.

Figure 2:
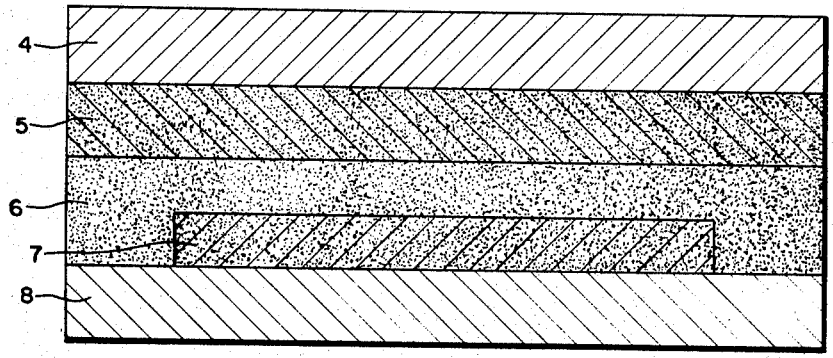
FIG. 2 is a cross sectional view of a preferred embodiment of an electric cell of this invention.

The most advantageous results in the practice of this invention are obtained when both the anode and cathode of the solid state electric cell are of composite structure and contain dispersed solid electrolyte material therein, as shown in FIG. 2. This solid state cell construction is essentially that shown in the referred-to copending application S.N. 573,744. Where only a single composite electrode is used, the performance of the cell will be improved by making either electrode a composite one. The dispersed electrolyte preferably should be nonreactive with the materials used for cathode and anode.

Referring to FIG. 2 a preferred embodiment of a solid state electric cell construction is shown in which both the anode and cathode contain dispersed electrolyte and in which an electronically conductive material overlays the composite cathode layer and is in contact with the cathode composition but not coextensive therewith. The composite anode consists of an electronically conductive layer 4, e.g., silver, in contact with a mixed anode layer 5 of silver which contains dispersed therein carbon and electrolyte material. A method of preparing a particularly preferred silver-containing anode composition is described and claimed in copending application S.N. 615,351 and reference should be made thereto for a more detailed description. An electrolyte layer 6 is selected from ionically conductive silver-ion compositions, particularly $RbAg_4I_5$, $KAg_4I_5$, and $NH_4Ag_4I_5$ as shown in copending application S.N. 569,193 and the organic ammonium silver iodide compositions as shown in copending application S.N. 651,499. The composite cathode consists of a layer 7 of the organic ammonium polyiodide component together with carbon and electrolyte material dispersed therein. The relative amounts of carbon, electrolyte, and polyiodide are not critical and may be varied over a wide range. Preferably, the relative amounts of three components of the cathode blend may vary, on a wt. percent basis, from 20–80 polyiodide, 5–60 carbon, and 10–50 electrolyte. The electrolyte material present in the composite anode and cathode is preferably of the same composition as the material used for electrolyte element 6. A preferred solid state cell includes a silver-containing anode, a solid electrolyte element comprising $N(CH_3)_4Ag_8I_9$, and a polyiodide-containing cathode comprising $N(C_2H_5)_4I_3$. Where the solid electrolyte element is $RbAg_4I_5$ or $KAg_4I_5$, it is preferred to use a polyiodide-containing cathode having a higher iodine content, e.g., a cathode comprising $N(C_2H_5)_4I_7$.

For preferred polyiodide compositions $QI_n$ utilized for the cathode component, Q is a quaternary ammonium cation whose substituents are selected from methyl and ethyl radicals and $n$ varies from 3 to 9. As a matter of preferred construction, layer 7 has been shown as not being coextensive with conductive layer 8 so as to avoid possible shortcircuiting of the cell. Thereby, the organic ammonium polyiodide, which has a certain vapor pressure of iodine, is also more conveniently retained in the carbon matrix. Layer 8 consists of a suitable electronically conductive material nonreactive with the cathode material, e.g., tantalum, molybdenum, niobium, carbon, or various conductive plastics which are essentially nonreactive with iodine, particularly where the iodine has a lower activity, which occurs when an organic ammonium polyiodide is utilized as the electron acceptor material. Electrical leads (not shown) are conventionally attached to the anode and cathode conductive layers 4 and 8, respectively.

The following examples are illustrative of the practice of this invention with respect to preferred embodiments relating to solid state cells utilizing improved cathode compositions. These examples should not be construed as limiting with respect to optimization of cell current and voltage, which are functions of the material selected for the electrodes and electrolyte, cell construction techniques, and internal resistance of the cell as determined by electrolyte layer thickness, contact resistance between adjacent layers, and other related cell parameters. For a solid state cell having a conductive silver anode and a silver ion electrolyte, the cell voltage will generally be a function of the cathode composition, although the current obtained will be dependent upon the other parameters as described. Optimization of these several parameters may be achieved by routine experimentation in accordance with the teachings of this invention and the known art relating to solid state cells.

Example 1.—Preparation of quaternary ammonium polyiodides

A molar portion of tetramethylammonium iodide was reacted with varying molar portions of iodine in a closed vessel at a temperature of 65° C., the molar amounts of iodine used varying from 1 to 3 moles $I_2$ per mole of tetramethylammonium iodide. Polyiodide compositions were obtained in all instances, having an empirical formula ranging from $N(CH_3)_4I_3$ to $N(CH_3)_4I_7$, the equilibrium vapor pressure of the polyiodide products increasing with increasing iodine content but being substantially below that of pure iodine. Similar polyiodide products were prepared by performing the reaction at 120° C. followed by quenching of the reaction product. These techniques of preparation were also used to prepare other polyiodide compounds $QI_n$. Several typical preparations are shown as follows:

To 12.16 g. of $(C_2H_5)_3NCH_3I$ was added 12.7 g. of $I_2$. As soon as the $I_2$ was added, the contents changed to a black liquid. After 1½ hr. no smell of $I_2$ was detectable and the contents started to harden.

To 13.56 g. of $(C_2H_5)_3NC_3H_7I$ was added 12.7 g. of $I_2$, the contents becoming liquid upon $I_2$ addition. After 1½ hr. the contents were hard and black in color. No odor of $I_2$ was detectable.

To 13.16 g. of $(CH_3)_3NC_6H_5I$ was added 12.7 g. of $I_2$. The compounds were blended together, forming a silver blue-green product. After 1½ hr., a slight odor of $I_2$ was noted.

To 14.96 g. of $C_2H_5N(C_3H_7)_3I$ was added 12.7 g. of $I_2$, the contents becoming liquid. After 1½ hours the contents were almost hard, but still wet. No odor of $I_2$ was noted.

To 15.66 g. of $N(C_3H_7)_4I$ was added 12.7 g. of $I_2$. The contents were blended together, no liquid being formed. After 1½ hr. the mix turned green in color and had a strong pungent odor.

To 10.05 g. of $N(CH_3)_4I$ was added 12.7 g. of $I_2$. The contents were blended together, no liquid being formed. After 1½ hr. the contents turned green in color. No odor of $I_2$ was detectable.

Example 2.—Preparation of cathode blend

Cathode blends of 1 g. electrolyte, 1 g. carbon, and 3 g. polyiodide (varying from $N(C_2H_5)_4I_3$ to $N(C_2H_5)_4I_9$) were prepared by melting $RbAg_4I_5$ electrolyte together with the carbon, blending in tetraethylammonium iodide, and heating to 120° C. with iodine. While a suitable blend was obtained, the utilization of $I_2$ was only about 75%. Utilization approaching 100% was obtained when carbon was first blended with an aqueous solution of tetraethylammonium iodide, and the blend was then dried and powdered and added to an acetone solution of $RbAg_4I_5$. The acetone was vaporized off from the mixture, the recovered product was dried and powdered, and the desired amount of iodine was then added. The mixture was heat cured for 18 hours at 115° C. followed by 48 hours at 65° C.

Example 3.—Electric cell using organic ammonium polyiodide cathode composition Electric cells were prepared having a structure corresponding to that shown in FIG. 2. The anode composition consisted of a blend of silver, carbon and $RbAg_4I_5$. The electrolyte element was $RbAg_4I_5$. The cathode composition was prepared essentially as described for Example 2 and consisted of carbon, $RbAg_4I_5$ and the organic ammonium polyiodide. The measured cell voltages are shown in Table 1.

TABLE 1.—EMF OF ELECTRIC CELLS
[$Ag/RbAg_4I_5/QI_n$]

| $QI_n$ in Cathode | Wt. Percent Available $I_2$ | Open Circuit EMF (volts) |
|---|---|---|
| $(CH_3)_4NI_3$ | 56 | 0.655 |
| $(CH_3)_4NI_4$ | 64 | 0.643 |
| $(CH_3)_4NI_5$ | 73 | 0.652 |
| $(CH_3)_4NI_6$ | 76 | 0.667 |
| $(CH_3)_4NI_7$ | 80 | 0.667 |
| $(CH_3)_3NC_2H_5I_3$ | 54 | 0.652 |
| $CH_3N(C_2H_5)_3I_3$ | 51 | 0.64 |
| $(C_2H_5)_4NI_3$ | 50 | 0.640 |
| $(C_2H_5)_4NI_5$ | 67 | 0.643 |
| $(C_2H_5)_3NC_3H_7I_3$ | 48 | 0.633 |
| $C_2H_5N(C_3H_7)_3I_3$ | 46 | 0.614 |
| $(C_3H_7)_4NI_3$ | 45 | 0.604 |
| $(C_3H_7)_4NI_5$ | 63 | 0.625 |
| $(C_3H_7)_4NI_7$ | 72 | 0.657 |
| $(CH_3)_3NC_6H_5I_3$ (Trimethylphenylammonium triiodide) | 49 | 0.639 |
| $C_9H_7NHI_3$ (Quinolinium triiodide) | 50 | 0.655 |
| $C_9H_7NHI_5$ (Quinolinium pentaiodide) | 66 | 0.657 |
| $C_9H_7NCH_3I_3$ (1-methylquinolinium triiodide) | 48 | 0.648 |
| $C_9H_7NCH_3I_5$ (1-methylquinolinium pentaiodide) | 65 | 0.650 |
| $C_5H_5NCH_3I_3$ (1-methylpyridinium triiodide) | 53 | 0.658 |
| $C_5H_5NCH_3I_5$ (1-methylpyridinium pentaiodide) | 70 | 0.661 |

For a representative cell, using $N(C_2H_5)_4I_7$ as electron-acceptor cathode component, the total cathode weight (grams) of the constituents used for the cathode blend is:

$$0.17N(C_2H_5)_4I + 0.5I_2 + 0.1C + 0.27RbAg_4I_5$$
$$= 1.04 \text{ g./100 milliamp.-hr.}$$

For a 200 milliamp.-hr. cell, there is utilized 2.08 g. cathode, 1.40 g. anode, and 1.0 g. electrolyte, or 4.48 g./200 milliamp.-hr., calculating to a power density of 13.0 watt-hr./lb.

Example 4.—Electric cell using organic ammonium compositions for electrolyte and cathode A test cell of structure similar to that of FIG. 2 was prepared having an anode composition (1 g.) consisting of Ag, C, and $RbAg_4I_5$; pyridinium heptasilver octaiodide, $C_5H_5NHAg_7I_8$ (3 g.), as electrolyte; and a cathode composition (1 g.) consisting of carbon, $RbAg_4I_5$ and $N(C_2H_5)_4I_3$. The open circuit voltage obtained was 0.66 volt with a flash current of 650 milliamperes. Aften seven months storage, the open circuit voltage was 0.64 volt and the flash current was 150 milliamperes.

Similar cells were also prepared using organic ammonium silver iodide electrolytes, but using $RbI_3$ as the electron acceptor in a composite cathode. After seven months storage, flash currents for the best of these cells had decreased from an initial value of 120 ma. to 0.2 ma., and from an initial value of 100 ma. to 1 ma., thereby demonstrating the enhanced stability obtained by use of an organic ammonium polyiodide composition as electron acceptor compared with $RbI_3$.

The quaternary ammonium polyiodide cathode materials are advantageous compared with pure iodine in providing a lower iodine activity resulting in reduced cell corrosion and longer shelf-life. They are further advantageous over other inorganic polyiodides such as $RbI_3$ or $CsI_3$ in providing a lower iodine activity, a higher weight percent of available iodine, lower cost, nonreactivity with the electrolytes $RbAg_4I_5$ or $KAg_4I_5$, longer cell shelf-life, and greater compatibility with organic ammonium silver iodide electrolytes.

It will of course be understood that many variations can be made with respect to the solid state electric cells of the present invention characterized by an improved cathode composition without departing from the inventive concept herein. Improved features of construction used for conventional solid state electric cells, in order to minimize polarization and assure cathode and anode stability and the like, may be readily utilized with little or no modification of the preferred cell construction illustrated herein. The further advantages are obtained of highly superior electric cell characteristics, particularly long shelf-life, as well as stability over a wide temperature range, because of the improved cathode compositions used in the present cells. Also, while the present electric cell is of principal interest and utility as a primary cell, it may also be utilized as a secondary cell, particularly by selecting the polyiodide cathode electron acceptor so as to produce a reaction product with silver having a lower decomposition potential than that of the solid electrolytes themselves.

Accordingly, while the principle of the invention and its preferred mode of operation have been explained in accordance with the patent statutes, and what is now considered to represent its best embodiment has been illustrated and described, it should be understood that within the scope of the appended claims, the invention may be practiced otherwise than as specifically illustrated and described.

I claim:

1. A solid state electric cell having an anode, a cathode, and a solid electrolyte disposed therebetween in cooperative relation, wherein the improvement comprises a cathode utilizing as electron acceptor material an organic ammonium polyiodide having the empirical formula $QI_n$ where Q is an organic ammonium cation having an ionic volume between 30 and 85 cubic angstroms and $n$ has a value from 2 to 11.

2. A cell according to claim 1 where Q is an aliphatic group-substituted quaternary ammonium cation where the total number of carbon atoms in the groups attached to the nitrogen atom varies from 4 to 9.

3. A cell according to claim 2 where the four groups attached to the nitrogen atom of the quaternary ammonium cation are selected from methyl and ethyl groups.

4. A cell according to claim 3 where Q has the formula $N(CH_3)_4$ and $n$ has a value ranging from 3 to 7.

5. A cell according to claim 3 where Q has the formula $N(C_2H_5)_4$ and $n$ has a value ranging from 3 to 7.

6. A cell according to claim 5 where $QI_n$ is $N(C_2H_5)_4I_7$.

7. A solid state electric cell according to claim 1 wherein said anode comprises silver, said solid electrolyte is a silver-ion electrolyte selected from the class consisting of $KAg_4I_5$, $RbAg_4I_5$, $NH_4Ag_4I_5$, and $QAg_aI_{a+1}$ and mixtures thereof, and the cathode comprises $QI_n$, the value of $a$ being between 3 and 39 and $n$ having a value from 2 to 11.

8. A cell according to claim 7 wherein said anode comprises an intimate mixture of silver, carbon, and solid electrolyte material, and said cathode comprises an intimate mixture of carbon, $QI_n$, and solid electrolyte.

9. A cell according to claim 7 wherein the solid electrolyte is $RbAg_4I_5$, Q is selected from methyl and ethyl groups, and $n$ has a value ranging from 3 to 7.

10. A cell according to claim 9 where $QI_n$ is $N(C_2H_5)_4I_7$.

11. A cell according to claim 7 wherein the solid electrolyte is an organic ammonium silver iodide salt, Q is selected from methyl and ethyl groups, and $n$ has a value ranging from 3 to 7.

12. A cell according to claim 11 where $QI_n$ is $N(C_2H_5)_4I_3$.

References Cited

UNITED STATES PATENTS

| | | | |
|---|---|---|---|
| Re. 24,408 | 12/1957 | Hack et al. | 136—83 |
| 2,689,876 | 9/1954 | Lehovec | 136—100 |
| 2,690,465 | 9/1954 | Broder | 136—153 |
| 2,696,513 | 12/1954 | Lehovec | 136—83 |
| 3,379,569 | 4/1968 | Berger et al. | 136—6 |
| 2,905,740 | 9/1959 | Smyth et al. | 136—83 |
| 3,057,760 | 10/1962 | Dereska et al. | 136—137 |

WINSTON A. DOUGLAS, Primary Examiner

A. SKAPARS, Assistant Examiner

U.S. Cl. X.R.

136—153

PO-1050
(5/69)

UNITED STATES PATENT OFFICE
CERTIFICATE OF CORRECTION

Patent No. 3,476,605          Dated    November 4, 1969

Inventor(s) Boone B. Owens

It is certified that error appears in the above-identified patent and that said Letters Patent are hereby corrected as shown below:

Column 1, line 56, "Soild" should read --Solid--

Column 3, line 61, "acrylic" should read --acyclic--

Column 10, lines 1 and 7, for each occurrence after "Q is" insert --an aliphatic group-substituted quaternary ammonium cation where the four groups attached to the nitrogen atom of the quaternary ammonium cation are--

Signed and sealed this 4th day of May 1971.

(SEAL)
Attest:

EDWARD M. FLETCHER, JR.          WILLIAM E. SCHUYLER, JR.
Attesting Officer                   Commissioner of Patents